United States Patent [19]

Lefebvre

[11] Patent Number: 4,599,364

[45] Date of Patent: Jul. 8, 1986

[54] CHEMICAL MODIFICATION OF MEMBRANE TO MODIFY TRANSPORT PROPERTIES

[75] Inventor: Michel S. Lefebvre, Sydney, Australia

[73] Assignee: Limit Instant Limited, England

[21] Appl. No.: 690,501

[22] PCT Filed: Apr. 11, 1984

[86] PCT No.: PCT/AU84/00059

§ 371 Date: Dec. 17, 1984

§ 102(e) Date: Dec. 17, 1984

[87] PCT Pub. No.: WO84/04256

PCT Pub. Date: Nov. 8, 1984

[30] Foreign Application Priority Data

Apr. 20, 1983 [GB] United Kingdom ................. 8310666

[51] Int. Cl.$^4$ ............................. C08D 5/20; C08J 9/36
[52] U.S. Cl. ................................ 521/53; 210/500.38; 521/27; 525/420
[58] Field of Search .................... 525/420; 521/27, 53; 210/500.2

[56] References Cited

U.S. PATENT DOCUMENTS

| | | | |
|---|---|---|---|
| 3,238,180 | 3/1966 | Wiloth | 521/27 |
| 3,887,499 | 6/1975 | Hodgdon | 521/27 |
| 3,994,866 | 11/1976 | Lund et al. | 210/500.2 |
| 4,174,426 | 11/1979 | Asami et al. | 521/27 |
| 4,243,776 | 1/1981 | Marconi et al. | 525/420 |
| 4,265,959 | 5/1981 | Sano et al. | 521/27 |
| 4,269,967 | 5/1981 | Elfert et al. | 210/500.2 |
| 4,330,406 | 5/1982 | Sano et al. | 210/500.2 |
| 4,396,727 | 8/1983 | Ishigaki et al. | 521/27 |
| 4,409,339 | 10/1983 | Matsuda et al. | 521/27 |
| 4,471,110 | 9/1984 | Christell | 210/500.2 |

*Primary Examiner*—Harold D. Anderson
*Attorney, Agent, or Firm*—Basile, Weintraub & Hanlon

[57] ABSTRACT

The transport properties of a polymeric ultrafiltration membrane are modified by passing aqueous liquid through the membrane at a temperature less than the glass transition temperature, progressively lowering the pH of the liquid to break hydrogen bonds in the polymer, and reacting the activated polymer with a reagent which is a reactive textile finishing product.

7 Claims, 1 Drawing Figure

CHEMICAL MODIFICATION OF MEMBRANE TO MODIFY TRANSPORT PROPERTIES

BACKGROUND OF THE INVENTION

1. Field of the Invention

The present invention relates to a method for the treatment of membranes to modify the properties thereof and to the membranes modified by such treatment. The membranes are industrially applicable in the field of ultrafiltration.

2. Description of the Prior Art

Membranes are obtained from various types of polymers generally by phase inversion processes. Their structure is partly crystalline, partly amorphous. The cohesion between the molecular chains is generally achieved by hydrogen bonding. The porous structure is extremely divided or loose and is totally temperature stable only below the first transition point.

Because of the manufacturing techniques involved, membranes generally present a radical local charge effect. This is due to the fact that during coagulation, or more generally phase inversion, some chains are blocked in a non-crystalline structure; and radicals have their charge potential non-counterbalanced by an adjoining counter radical from an adjoining chain.

Due to this effect, rejection of molecules by membranes is greatly influenced by the relative isoelectric point of the molecule retained at the particular pH because of molecular interaction between a negatively charged membrane and negatively charged molecules, e.g. proteins rather than the size of the molecule.

What appears to be an advantage in terms of rejection is also a disadvantage in terms of membrane poisoning. In fact, when ultrafiltration or other membrane-related processes are used for the treatment of a complex medium (e.g. blood, molasses, sugar-cane juice, whey) or generally any natural medium containing a large spectrum of various molecules those which are repelled by a partly charged membrane. The molecules are always accompanied by, molecules which are countercharged and will fix onto the membrane to create membrane poisoning.

Any membrane is a polymeric structure derived from natural, artificial or synthetic polymers. The cohesion of the structure in the original polymer is due to chemical bonds. A portion of these bonds are broken before the formation of the membrane, a portion of these are not reconstituted in the non-crystalline region of the polymer which constitutes the membrane. For example, carboxyl groups (C=O) and amine groups (—NH$_2$) will be present locally at the surface of the polymer chains. Even for membranes which are described as being totally neutral, at the molecular level part of the structure has local ion-exchange properties, or local strong electro-chemical properties.

It is an object of the present invention to provide a method for transforming the surface characteristics of the polymer of the membrane—both at the surface of the membrane as such and within the internal structure thereof—to block the electro-chemical interactions, to achieve an antipoisoning effect at the molecular level; and to maintain steady flux characteristics during long-term use of the membrane.

It is a futher object of this invention to provide a process whereby one type of membrane can be used as a matrix for further reticulation or modification of the porous structure to give a large variety of possible molecular weight cut-offs from the same membrane structure.

By the use of previously known processes, the modification of the porous structure of membranes by grafting is extremely difficult to achieve without modification of the original membrane matrix. To graft any molecule onto the polymeric structure on a uniform basis, it is necessary to achieve accessability inside the polymer for the molecule chosen as the grafting reagent. The conventional method previously used was to increase the temperature well above the glass transition point of the polymer, to give the molecular chains sufficient flexibility to achieve diffusion of the reactive species.

This process is, however, not suitable for use with membranes because the use of temperatures above the glass transition point would destabilize the very fine and delicate structure of the membrane.

SUMMARY OF THE INVENTION

The present invention provides a method for the modification of the transport properties of a polymeric ultrafiltration membrane which comprises: (a) subjecting the membrane to a flux of a polar solvent at a temperature below the glass transition temperature of the membrane polymer; progressively lowering the pH of the liquid to break hydrogen bonds within the polymer structure and produce an activated polymer having active groups thereon; and reacting the activated polymer with a reagent which is reactive therewith.

The polar solvent can be water, though other polar solvents such as liquid ammonia give the same advantage. The polar solvent is a solvent for the ionic species used to lower the pH but not a solvent for the polymeric material of the membrane.

The glass transition temperature is a well known parameter and may be measured by differential thermal analysis techniques. The glass transition temperatures for polyamide -6 and 6-6 are approximately 50° C. and 54° C. respectively depending on degree of polymerization.

Thus the present invention provides a process which, first permits the opening of the molecular structure of the constitutive polymer of the membrane at a temperature below the glass transition point. Second, it permits the grafting of various molecules and radicals onto the polymeric chain below the glass transition temperature.

Third, by modification of the dimensions of the graft chain employed, it is possible to restrict the pore dimensions of a given membrane and to adjust the molecular weight cut-off thereof to suit a particular need or application. Fourth, it is possible to achieve either partial or complete saturation of active surface groups, and to avoid poisoning by components which have an electro-chemical interaction with the surface of the polymer.

DESCRIPTION OF PREFERRED EMBODIMENTS

Figure 1:
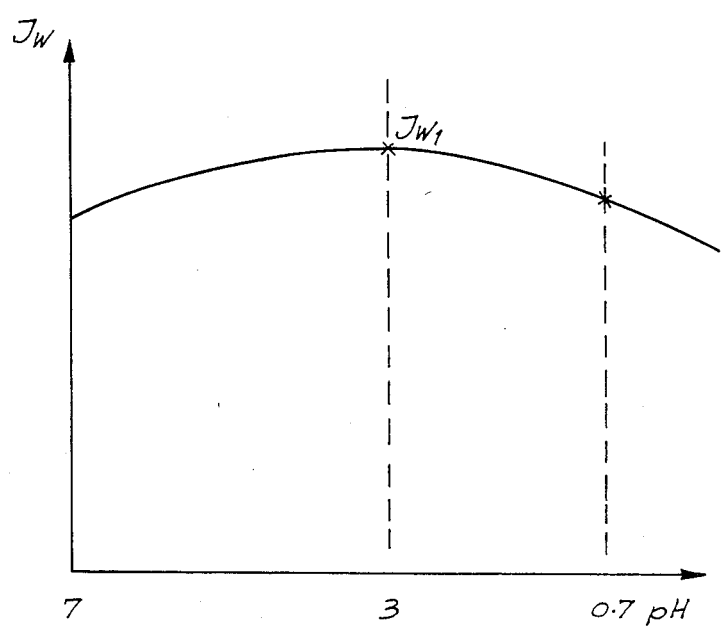

The invention will be further described by way of example only with reference to specific embodiments of the invention.

EXAMPLE 1

Membranes made from polyamide -6 are obtained from a polymer which is a product of polymerization of caprolactam

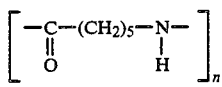

The link between the chains can be represented as in Formula (2) below

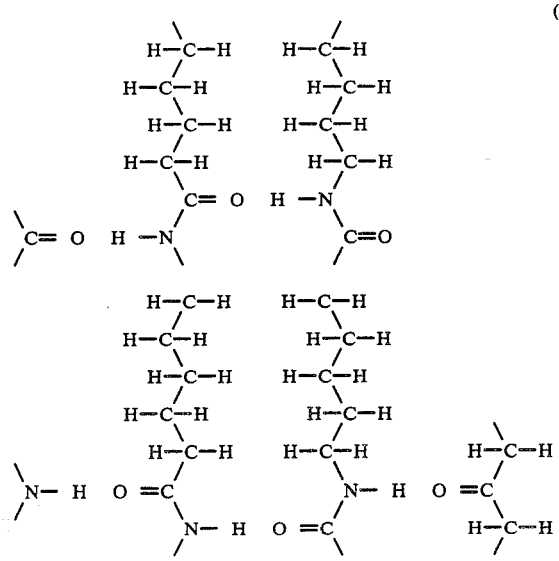

According to Formula (2) the cohesion between chains in the crystalline part of the polymer is achieved by means of hydrogen bonds between the oxyen atom of the C=O group and the hydrogen atom of the N—H group. This type of bonding is totally stable up to approximately 50° C., but will be loosened at higher temperatures. This factor is used in the textile industry for dyeing polyamide -6 fibres using acid reactive dyestuffs at temperatures generally above 100° C.

An acid reactive dyestuff can be employed according to an embodiment of the present invention. The acid reactive dyestuff has the general formula:

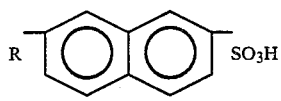

wherein R can have a variety of values well known in the dyestuff field. The polymer to be treated is subjected to a gradual variation in pH in the presence of a wetting agent to open up the molecular chains at a temperature below the glass transition point. Preferably, the membrane was subjected to a distilled water flux at a trans-membrane pressure below the pressure at which the membrane will be used, with a gradual lowering of the pH from 7 to whatever value may be required in this instance 0.7 with continuous monitoring of the water flux. The water flux $J_W$, measured at 35° C., is plotted against pH in FIG. 1. The mixture used for the treatment comprised 90% distilled water, 9% ethyl alcohol and 1 % methyl alcohol.

In this particular example, from pH7 to pH3 the water flux increases, showing the effect of the wetting agent (i.e. the alcohols) on the surface of the polymer. The wetting agent acts to increase the transport properties in the vicinity of the polymer. A membrane swelling effect is also noted due to the addition of hydrochloric acid (HCl) to lower the pH. The water flux from pH3 to pH 0.7 decreases indicating a higher concentration of hydrogen ions resulting from the break down hydrogen bonds inside the porous structure which then starts to collapse. This first operation is called activation of the polymer, and is stopped when the water flux is equal to, or not less than, the original water flux. At this stage, a sufficient number of hydrogen bonds have been broken without destruction of the porous structure which would give too large a drop in water flux. After rinsing with double-distilled water, a reactive molecule (e.g., a reactive dyestuff of general Formula (3)) is applied in the form of a dilute solution to achieve complete saturation of the dyestuff in the polymer.

The saturation effect is controlled by the fact that the shade or tone of the fibre reaches an equilibrium and that no more active sites are available for dyestuff fixation. In the particular case of polyamides, an acid-type dyestuff is used, but the colour given by the radical R for Formula (3) is of no importance. The treated membrane is then washed with distilled water to remove excess dyestuff.

Sulphonic acid derivative dyestuffs available under the KITON trademark (Ciba-Geigy) are particularly suitable for this application.

Although the invention is described above with particular reference to the application of dyestuffs, the any reactive molecule with a reactive group having a tendency to fix onto one of the active groups of the polymer chain can be used.

For example it is possible to add reactive groups which lend to the polymer constituting the membrane, properties such as transport of alcohol but rejection of water. The surface properties of other membranes can be changed by the addition of reactive groups which change form with change in ph, such as amphoteric dyes. Such membranes could be suitable for applications requiring transport of water without the transport of salts such as reverse osmosis membranes.

Any reactive finishing product used in the textile industry for finishing fibres of the same polymeric composition as the membrane, can be used, for example, hydrophobic properties may be imparted by incorporation of a fluorocarbon or chlorofluorocarbon chain, typically using a sulphonic acid derivative. Hydrophobic properties may be achieved using the classical finishing products of the textile industry, for example, derivatives of hydrocarboxy cellulose. The change in molecular weight of the reactive finishing product determines the restriction of the pore structure of the membrane to achieve change in the molecular weight cut-off by reducing the diameter of the pores due to the graft-added molecular structure at the surface.

Inversely, the reaction carried out according to FIG. 1 shows that an increase of water flux associated with the dilation or expansion of the pores can be achieved. If the reaction is stopped at point $J_{W1}$ (FIG. 1), and the membrane polymer is grafted with small chain reactive compounds, then a membrane with high M.W. cut-off is obtained.

EXAMPLE 2

Hollow fibre membranes, made from polyamide 6—6, were treated gradually according to FIG. 1 at 32° C., using a step-by-step process involving treatment at pH 7 for 30 minutes, pH4 for 30 minutes, pH3 for 30 minutes and pH2 for 30 minutes.

The membrane had an original molecular weight cut-off of 20,000 and a water flux of 1000 ml/minute at 32° C. The water flux $J_{W2}$ at pH2 is 1200 ml/minute. The reaction is stopped at a water flux of 970 ml/minute. The dyestuff used is Anthracine yellow acid reactive dye for polyamides. The dyeing reaction is carried out over 2 hours at 30° C. and 100 kPa difference.

The treated membrane produced in Example 2 can be compared to the untreated membrane in the manner set forth in the following example.

EXAMPLE 3

Cane sugar molasses diluted to 8 brix and subjected to ultrafiltration using treated and untreated membranes. The original flux was 2.3 l/hour/m$^2$ using the untreated membrane.

The treated membrane had an original flux of 13.5 liters/hour/m$^2$. The stabilized flux after 8 days of continuous operation was 10.8 l/hour/m$^2$, temperature 35° C., pressure (inlet) 50 kPa and (outlet) 150 kPa.

EXAMPLE 4

Sugar cane juice was filtered at 32° C. Untreated membrane achieved a stabilized flux of 15.5 l/hour/m$^2$; while the flux for the treated membrane was 32 l/hour/m$^2$.

Another application of the invention is the protection of polymer membranes through reticulation. Polyamide 6—6 membranes are susceptible to break down of the membrane by phenols. For example, an untreated hollow fibre membrane of polyamide 6—6 will be dissolved by a 5% phenol solution within a period of about two hours. However, another polyamide 6—6 hollow fibre membrane modified by a surface reticulation treatment according to the present invention is protected from the phenol and is still functional after two days.

According to the present invention the structure of a given membrane can be adapted to a particular need simply by treatment in accordance with the teaching of the present invention. This dramatically increases the utility of any given membrane and results in a reduction in membrane costs.

Although the invention has been described with reference to preferred embodiments and examples, it will be appreciated that the scope of the invention is not limited to or by such embodiments and examples, and that various modifications are possible without departing from the scope of the invention disclosed herein.

I claim:

1. A method for the modification of the transport properties of a polyamide ultrafiltration membrane comprising the steps of: treating the membrane with a flux consisting essentially of a polar solvent selected from the group consisting of water, liquid ammonia, and mixtures thereof at a temperature below the glass transition temperature of the membrane polymer; progressively lowering the pH of the polar solvent to break hydrogen bonds within the polymer structure and produce an activated polymer having active groups thereon; and reacting the activated polymer with a sulfonic acid derivative dye stuff reagent which is reactive therewith.

2. The method according to claim 1 wherein the polar solvent comprises a wetting agent selected from the group consisting of methyl alcohol, ethyl alcohol and mixtures thereof.

3. The method according to claim 1 wherein the flux passes through a maximum as the pH of the polar solvent is decreased; and wherein the activation treatment is stopped when the flux falls again to a value which is at least equal to the initial flux at the start of the treatment.

4. The method of claim 1 wherein the sulfonic acid derivative dyestuff reagent is an amphoteric dye which provides a membrane suitable as a reverse osmosis membrane.

5. The method according to claim 1 wherein the reagent provides hydrophilic functional groups.

6. The method of claim 1 wherein the reagent contains hydrophobic functional groups.

7. A method for the modification of the transport properties of a porous polymeric ultrafiltration membrane composed of a polyamide to change the molecular weight cut-off of the membrane and to reduce the susceptibility of the membrane to poisoning, comprising the steps of:

treating the membrane with a flux consisting essentially of an aqueous polar solvent at a temperature below the glass transition temperature of the membrane polymer;

progressively lowering the pH of the aqueous polar solvent to break hydrogen bonds within the polymer structure and produce an activated polymer having active groups thereon;

and reacting the activated polymer with a reagent which is reactive therewith selected from the group consisting of dyes and textile finishing products, so as to change the pore sizes of the porous ultrafiltration membrane and to neutralize local residual charges on the membrane thereby reducing the susceptibility of the membrane to poisoning.

* * * * *